Figure 1:
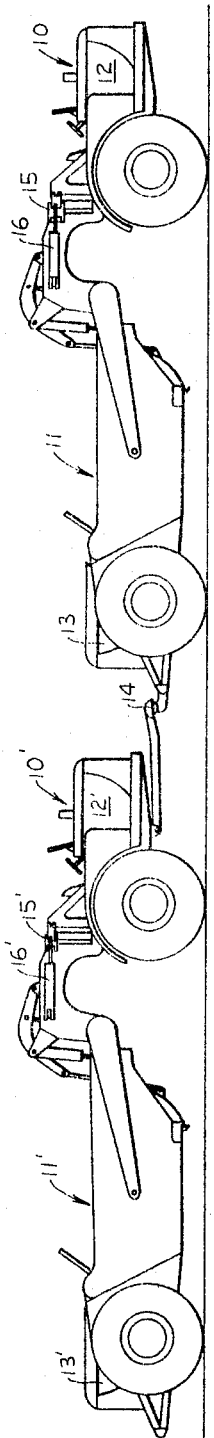

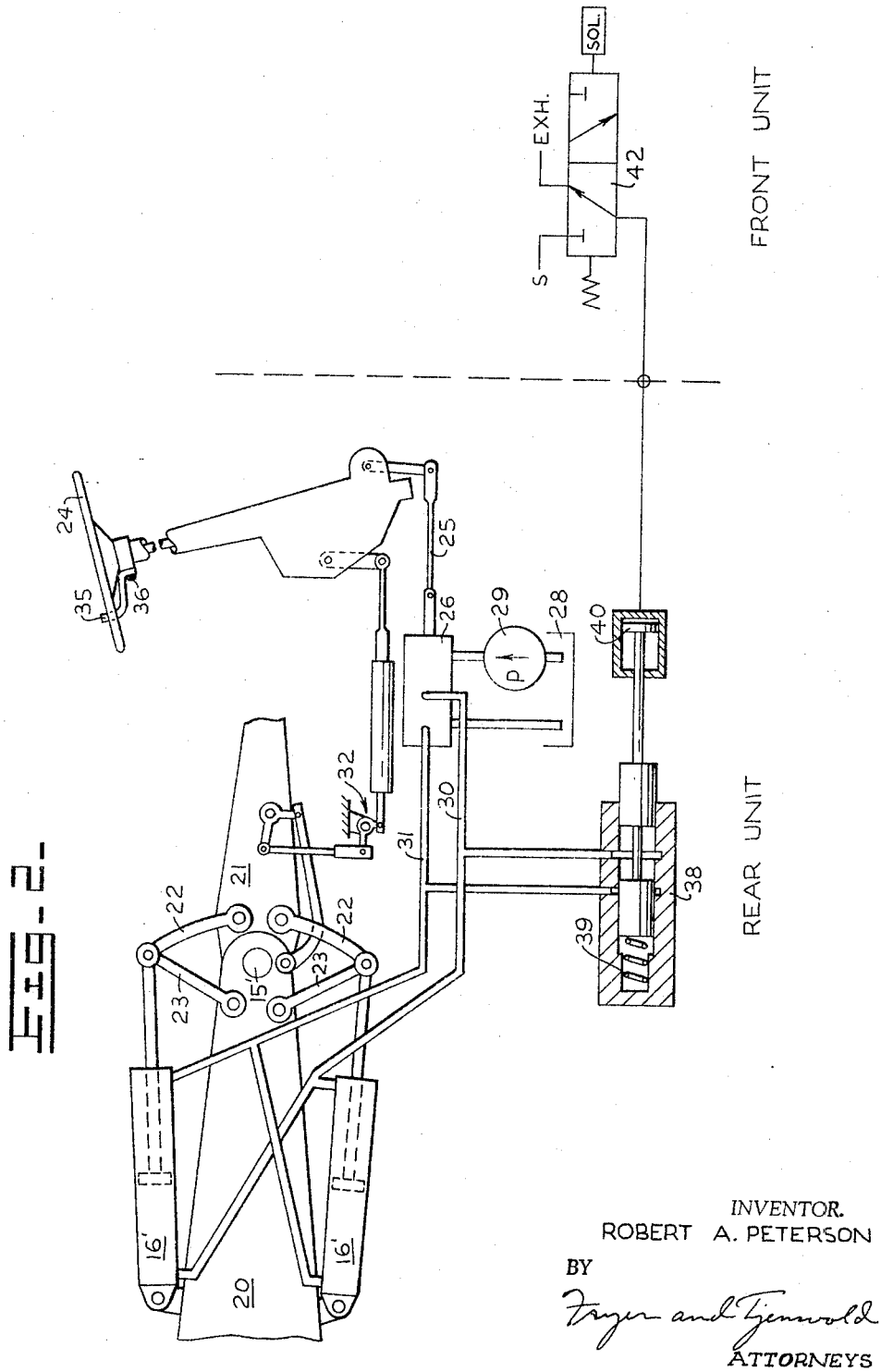

United States Patent Office 3,269,481
Patented August 30, 1966

3,269,481
STEERING CONTROLS FOR VEHICLES
OPERATING IN TANDEM
Robert A. Peterson, San Leandro, Calif., assignor to
Caterpillar Tractor Co., Peoria, Ill., a corporation of
California
Filed Dec. 2, 1964, Ser. No. 415,526
3 Claims. (Cl. 180—79.2)

This invention relates to controls for the steering mechanism of an articulated vehicle while it is coupled behind a similar vehicle and a single operator on the forward vehicle actuates all components of both vehicles.

Tandem operation of earthmoving equipment such as scrapers has proven effective in reducing the cost of moving earth particularly in large projects. It has been found that two scrapers in tandem can be efficiently controlled and operated by a single operator and, where both scrapers have engines producing adequate horsepower, the tandem combination is capable of loading a scraper bowl under its own power. This eliminates the necessity of one or more pusher tractors and operators heretofore used on most projects to augment the power of the scrapers during the load portion of their cycle.

The present invention is applied to tractor-scraper combinations operating in tandem in which the tractor which is of the two-wheel type is articulately connected to the scraper and steering is accomplished with hydraulic jacks extending between the tractor and the scraper. This gives rise to difficulty because there are three pivotal connections in each tandem arrangement of two tractor-scraper units. This creates a tendency toward buckling or jackknifing it force is applied from the rear. Since the scrapers, as well as the tractors, are powered, such force can be applied under some operating conditions and furthermore under extreme conditions even the tandem unit may be pushed by another tractor.

Articulation between the rear tractor and scraper is desirable whenever it is necessary to negotiate a turn but during loading of the scraper bowl when forces may be applied in the rear, the coupling between the rear tractor and scarper must be rigid to insure against jackknifing.

It is, therefore, the object of the present invention to provide means operable from a remote operator's station for selectively rendering the connection between a tractor and scraper rigid or articulate and to accomplish this with simple means that does not interfere with the steering mechanism normally controlling this connection.

Further and more specific objects and advantages of the invention and the manner in which it is carried into practice are made apparent in the following specification wherein the invention is described in greater detail by reference to the accompanying drawings.

In the drawings:

FIG. 1 is a view in side elevation of a tandem unit composed of two tractor-scraper combinations with which the present invention is used; and FIG. 2 is a schematic view of the steering system between a tractor and scraper of the units shown in FIG. 1 illustrating the modification of such a system in accordance with the present invention to enable an operator on the foremost tractor to exercise control over the connection between the rear tractor and its scraper.

The two scraper units coupled for tandem operation as illustrated in FIG. 1 each comprise a two-wheel tractor shown at 10 and 10' and a scraper shown at 11 and 11'. Each tractor is powered by an engine shown at 12 and 12' and engines 13 and 13' power the scrapers. The units are coupled by a universal connection in the form of a ball and socket joint shown at 14 and each tractor is coupled with its trailer by means of a hitch which includes a vertical pivot at the points 15 and 15'.

There are therefore three articulated connections in this two scraper unit and while the connections at the points 15 and 15' are controlled by steering mechanism including hydraulic jacks one of which is shown for each unit at 16 and 16', it is only the forward unit steering mechanism including the jacks 16 which are used in the operation of the tandem unit and in order that the rear tractor and scraper trail easily and do not require a turning radius which is excessive, the present invention provides means to disable the steering mechanism and permit free turning movement about the point 15'. However since any force applied from the rear of the tandem unit such as by a pusher or by the engine 13' tends to jackknife the unit about the pivots 14 and 15' the invention also provides means to prevent any turning movement about the point 15' before such force is applied.

The means for accomplishing the foregoing is best shown in FIG. 2 which schematically illustrates some of the steering mechanism. The steering of articulated units by means of hydraulic jacks is well known as evidenced by the patent to Gustafson 2,614,644 and the more recent patent to Baer et al. 3,130,806. A general understanding of such a system will therefore suffice in describing the present invention. FIG. 2 shows a portion of the tractor unit at 20 pivotally connected as at 15' to a portion of the scraper unit shown at 21. The jacks 16' are pivotally connected between the tractor and the scraper through the medium of links 22 used in conjunction with guide links 23. A steering wheel 24 acts through linkage, a part of which is shown at 25 for actuating a valve 26 to direct fluid under pressure taken from a reservoir 28 by a pump 29 to the jacks 16'. The valve is adjustable to direct fluid to the rod end of one jack and the head end of the other jack as through a line 30 and to reverse this operation by directing fluid through a line 31. Consequently steering in either direction may be effected. Follow-up linkage, generally illustrated at 32, forms a connection between the articulated member and steering wheel to prevent continuous steering upon slight turning of the steering wheel and to return the control valve 26 to a normal position each time the turning movement of the steering wheel is discontinued. The construction and operation of such linkage is clearly set forth in both of the patents above referred to and a detailed description thereof is not necessary to an understanding of the present invention.

When a rear scraper unit including the steering mechanism of FIG. 2 is used in a tandem combination, the tractor-scraper elements may be permitted to swing freely about the pivot 15' or may be held substantially rigidly in a straight line position. This is accomplished according to the present invention by a bracket 35 secured to the steering column of the wheel 24 as by cap screws 36 and having a bifurcated end which embraces one spoke of the steering wheel to prevent its rotation. In addition to this, a valve 38 is employed to establish communication between the lines 30 and 31 when desired. This valve may be of the spool type shown and urged to its closed position as illustrated by a spring 39. It may be opened by an actuating piston shown at 40 to which fluid is supplied by a spring opened, solenoid closed valve 42. The solenoid may be controlled by an electric switch mounted at the operator's station and has in fact been positioned to be automatically operated by placing the switch in a position to be opened by transmission shifting mechanism when it is shifted to the lowest gear ratio. This has proven practical because it is usually only when the scrapers are to be loaded that the very lowest gear ratio is employed and consequently shifting the transmission for this purpose which is done just prior to loading will serve automatically to prevent angular movement of the tractor and scraper about the pivot point 15'. With the valve 38 in the open position, communication is established between the lines 30 and 31 and the two cylinders 16' at their opposite ends so that the tractor and trailer are free to swing about the pivot 15'. When the rigid connection is required, the valve 38 is actuated to a closed position as illustrated and since the steering wheel 24 is locked against rotation, the valve 26 remains closed which tends to prevent articulation. If, however, external forces such as a pushing tractor or the like cause some angular displacement of the tractor and scraper which is possible through leakage of hydraulic fluid, the follow-up linkage 32 will sense this displacement and effect actuation of valve 26 to cause a transfer of fluid in the jacks 16' which will result in immediate realignment of the units.

I claim:

1. In tandem operating earthmoving scrapers wherein a rear scraper comprises a tractor unit articulately connected to a scraper unit and wherein steering means includes hydraulic jacks extending between said units on opposite sides and a steering wheel controlling flow of fluid under pressure to and from opposite ends of the jacks on opposite sides through a circuit including a pressure source, the improvement which comprises means including a valve in said circuit to provide communication between opposite ends of said jacks on opposite sides and free articulation between the tractor and scraper units independently of the steering wheel control.

2. The combination of claim 1 with means to hold the steering wheel against turning movement, and in which said valve when closed prevents flow to and from opposite ends of the steering jacks to establish a rigid connection between the tractor and scraper units.

3. The combination of claim 2 with a forward unit having an operator's station for control of the rear scraper, and means at said station for opening and closing said valve.

References Cited by the Examiner

UNITED STATES PATENTS

| | | | |
|---|---|---|---|
| 2,762,634 | 9/1956 | Moseley | 280—432 |
| 3,159,230 | 12/1964 | Gordon | 180—79.2 |

BENJAMIN HERSH, *Primary Examiner.*

J. H. BRANNEN, *Assistant Examiner.*